United States Patent [19]

Oganesian

[11] 4,226,819
[45] Oct. 7, 1980

[54] METHOD OF PRODUCING KERAMZIT

[76] Inventor: Rafik B. Oganesian, Daev pereulok, 31, kv. 15, Moscow, U.S.S.R.

[21] Appl. No.: 892,986

[22] Filed: Apr. 3, 1978

Related U.S. Application Data

[63] Continuation of Ser. No. 727,012, Sep. 27, 1976, abandoned.

[51] Int. Cl.$^2$ ............................................. C04B 33/04
[52] U.S. Cl. ................... 264/43; 106/40 R; 264/66
[58] Field of Search ................. 264/43, 66, DIG. 43, 264/44; 106/40 R

[56] References Cited

U.S. PATENT DOCUMENTS

| | | | |
|---|---|---|---|
| 2,693,017 | 11/1954 | Czarnecki | 264/66 |
| 2,706,844 | 4/1955 | Nicholson | 264/43 |
| 3,118,658 | 1/1964 | Dennert | 264/43 |
| 3,634,250 | 1/1972 | Commons | 264/43 |
| 3,702,257 | 5/1972 | Koning | 264/43 |

FOREIGN PATENT DOCUMENTS

| | | | |
|---|---|---|---|
| 2088578 | 7/1972 | France | 264/43 |

*Primary Examiner*—John A. Parrish
*Attorney, Agent, or Firm*—Robert E. Burns; Emmanuel J. Lobato; Bruce L. Adams

[57] ABSTRACT

A method of producing Keramzit by means of treating clay to form a clayey mass, subsequently granulating it, drying the granules at a temperature of 100° to 150° C., heat-treating the dried granules at a temperature of 200° to 500° C., calcining them in two stages-at a temperature at the first stage of 800° to 1,150° C. for 0.5 to 10 minutes and at a temperature at the second stage of 1,150° to 1,250° C. for 1 to 5 minutes, and cooling the Keramzit produced.

The Keramzit produced according to the proposed method finds application in manufacturing all types of light-weight concretes.

The method makes it possible to produce a light-weight Keramzit having a low bulk density from 100 to 400 kg/m$^3$ and a strength on compression in a cylinder of from 3 to 22 kgf/cm$^2$, and a high-strength Keramzit having a bulk density of from 550 to 1,100 kg/m$^3$ and a strength on compression in a cylinder of from 37 to 200 kgf/cm$^2$.

4 Claims, No Drawings

METHOD OF PRODUCING KERAMZIT

This is a continuation of Ser. No. 727,012, filed Sept. 27, 1976, now abandoned.

BACKGROUND OF THE INVENTION

The present invention relates to building materials, and more particularly, to a method of producing Keramzit used for making all types of light-weight concretes.

Known in the prior art is a method of producing Keramzit in rotary kilns which comprises treating clay to form a clayey mass, granulating it, drying the Keramzit granules formed at a temperature of 100° to 150° C., heat-treating the dried granules at 200° to 500° C., heating them from a temperature of 200° to 500° C. to a temperature of 1,100° to 1,200° C. for 15 to 20 minutes, calcining at 1,100° to 1,200° C. for 10 to 12 minutes and cooling to 50° C. (S. P. Opatsky, Production of Keramzit).

Prolonged heating from a temperature of 200°–500° C. to a temperature of 1,100°–1,200° C. and restriction of the temperature conditions of calcining the granules to the upper limit of the temperature range of swelling (otherwise a sweating of the surface of Keramzit takes place) determine a higher bulk volume of Keramzit.

The above-mentioned method does not make it possible to produce Keramzit with a clinker-like compact crust having a varying thickness and ensuring its higher strength and lower water absorption.

This method does not make provision for accurate control of the temperature and the time of calcining crude Keramzit granules and thereby restricts the range of the Keramzit produced as regards its bulk density and strength.

The prior art teaches a method of manufacturing light-weight Keramzit which uses the effluent treatment product and clay as starting materials. The granules made from this mass are calcined at a temperature of 1,000° to 1,200° C. according to conventional technology (cf. the above reference). This method also does not make it possible to produce Keramzit with improved properties for the above reasons.

There is also known a circulation method of producing Keramzit in a spouting bed.

This method comprises partial drying, comminution of clay, granulation of the clayey mass in tray granulators, drying of the Keramzit granules formed at a temperature of 200° C., calcining with a thermal shock at a temperature of 1,100° to 1,200° C. for 45 seconds in a spouting bed and subsequent cooling. The Keramzit produced features a hard, strong and thin envelope and a bulk density of 500 kg/m$^3$.

The disadvantage of the above-described method lies in that it does not provide for the production of Keramzit with a swelled-up nucleus and a compact strong clinker-like crust of a varying thickness.

The Keramzit produced according to this method from the same clay and in the same thermal unit has a limited range as regards both the bulk density and the strength.

SUMMARY OF THE INVENTION

The primary object of the present invention is to provide such calcination conditions that would make possible the production of Keramzit having both a higher strength and a lower bulk density.

Said primary object is accomplished by the provision of a method of producing Keramzit by means of treating clay to form a clayey mass, subsequently granulating it, drying the granules at a temperature of from 100° to 150° C., heat-treating the dried granules at a temperature of 200° to 500° C., calcining them and cooling the Keramzit produced, wherein, according to the invention, the calcining is effected in two stages—at a temperature of 800° to 1,150° C. for 0.5 to 10 minutes at the first stage, and a temperature of 1,150° to 1,250° C. for 1 to 5 minutes at the second stage.

DESCRIPTION OF THE INVENTION

The proposed invention is realized in the following manner.

The clay from the clay pit is fed into a clay-loosening machine. Thereafter the clay is fed into a box feeder and then onto a belt conveyor. The belt conveyor transports the clay to stone-separating rolls where the removal of stone inclusions and the preliminary treatment of the clay take place. Therefrom the clay is directed to a two-roll mixer and fed onto perforated processing rolls or a belt press wherein granules are formed from the resultant clayey mass. The granules are directed to a drying drum and dried at a temperature of 100° to 150° C. and then heat-treated in a layer-type preparatory unit at a temperature of 200° to 500° C. depending on the properties of the clay. The preparatory unit is heated through the utilization of exhaust gases from the calcining kiln. The granules are then fed onto the surface of the hearth of a rotary annular kiln (calcining kiln), the hearth revolving about its axis, and moved to the calcining zone when the granules are rapidly heated (thermal shock). The temperature at the first stage in the kiln is maintained at 800° to 1,150° C. and the granules are kept at this temperature for 0.5 to 10 minutes.

The temperature at the second stage in the kiln is maintained at 1,150° to 1,250° C. and the granules are kept at this temperature for 1 to 5 minutes.

For example, to produce Keramzit with a bulk density of 540 kg/m$^3$ and a strength of 37.1 kgf/cm$^2$ from a clay having the following composition, in percent by weight:SiO$_2$—73.88; Al$_2$O$_3$—14.50; Fe$_2$O$_3$+FeO—4.74; CaO—2.68; MgO—0.69; K$_2$O+Na$_2$O—2.36, the calcining temperature at the first stage is 1,000° C. for two minutes, and the calcining temperature at the second stage is 1,220° C. for 5 minutes.

The calcination at the first stage at a temperature of 800° to 1,150° C. for 0.5 to 10 minutes ensures the removal from the upper layers of granules of gaseous products and the formation in a granule of an outer oxidized zone whose thickness depends on the duration of heating. The calcination at the second stage at 1,150° to 1,250° C. for 1 to 5 minutes converts the oxidized zone of the granules into a clinker-like high-strength crust and swells the nucleus. Keramzit is cooled in a cooler, for example, a layer-type cooler, by means of blowing air through a layer of the material to a temperature of 50° C.

The present method provides for extension of the range of types of Keramzit made from the same clay and in the same thermal unit, and makes it possible to produce:

light-weight Keramzit having a bulk density of 100 kg/m$^3$ to 400 kg/m$^3$ which is up to twice as low as that of Keramzit produced in rotary kilns. The strength of Keramzit increases by 10 percent;

high-strength Keramzit having a bulk density of 550 to 1,100 kg/m³ and a strength on compression in a cylinder of 37 to 200 kg//cm². The strength of Keramzit increases up to 80 percent.

To produce Keramzit according to the proposed method, clays of the following composition, in percent by weight, may be used:
$SiO_2$ — 46 to 75; $Al_2O_3 + TiO_2$ — 24 to 11; $Fe_2O_3 + FeO$ — 10 to 5;
$CaO$ — 10 to 1; $MgO$ — 5 to 1; $K_2O + Na_2O$ — 5 to 2.

For a better understanding of the present invention the following examples of producing Keramzit are given.

EXAMPLE 1

To produce Keramzit, a clay having the following composition, in percent by weight, is used:
$SiO_2$ — 73.88;  $Al_2O_3$ — 14.50;  $Fe_2O_3 + FeO$ — 4.74;  $CaO$ — 2.68;
$MgO$ — 0.69; $K_2O + Na_2O$ — 2.36.

The clay having the above-mentioned composition is transported from the clay pit to a clay-loosening machine. Then the clay is fed into a box feeder and onto a belt conveyor. The latter directs the clay to stone-separating rolls where the removal of stone inclusions and preliminary treatment of the clay take place. Therefrom the clay is fed into a two-roll clay mixer and directed to perforated processing rolls or a belt press where granules are formed from the resultant clayey mass. The granules are directed to a drying drum and dried at 120° C. and then heat-treated in a layer-type preparatory unit at 300° C.

The preparatory unit is heated with exhaust gases from the calcining kiln. The granules are then fed onto the surface of the hearth of a rotary annular kiln (calcining kiln), the hearth revolving about its axis, and moved to the calcining zone.

The temperature at the first calcining stage is 1,000° C. and the granules are kept at this temperature for 2 minutes. Then the granules move to the second calcining stage where they are kept at 1,220° C. for 5 minutes. The Keramzit produced is cooled to 50° C. It has a bulk density of 540 kg/m³, a strength on compression in a cylinder of 37.1 kgf/cm² and its water absorption is 11.7 percent by weight.

EXAMPLE 2

To produce Keramzit a clay is used of the composition of Example 1. The clay is treated in the same manner as in Example 1 but the temperature at the first stage of calcining is 900° C. and maintained for 5 minutes. The temperature at the second calcining stage is 1,170° C. and the granules are kept at this temperature for 5 minutes. The Keramzit produced has a bulk density of 830 kg/m³, a strength of 86.7 kgf/cm² and its water absorption is 5.35 percent by weight.

EXAMPLE 3

To produce Keramzit a clay is used of the composition of Example 1. The clay is treated in the same manner as in Example 1 but the temperature at the first calcining stage is 800° C. and the granules are kept at this temperature for 10 minutes, and the second calcining stage is effected at 1,250° C. for one minute. The Keramzit produced has a bulk density of 1,100 kg/m³, a strength of 200 kgf/cm² and its water absorption is 1.8 percent by weight.

EXAMPLE 4

To produce Keramzit a clay is used of composition of Example 1. The clay is treated in the same manner as in Example 1 but the temperature at the first calcining stage is 1,150° C. at which the granules are kept for 0.5 minutes, and the second calcining stage is effected at 1,225° C. for 5 minutes. The Keramzit produced has a bulk density of 280 to 300 kg/m³, a strength of 10 to 11 kgf/cm² and its water absorption is 16 to 18 percent by weight.

EXAMPLE 5

To produce Keramzit a clay is used of the following composition, in percent by weight:
$SiO_2$ — 56.64; $Al_2O_3$ — 19.84; $Fe_2O_3 + FeO$ — 8.53;
$CaO$ — 3.36; $MgO$ — 3.75; $K_2O + Na_2O$ — 4.96.

The clay is treated in the same manner as in Example 1 but the temperature at the first calcining stage is 1,000° C. at which the granules are kept for 3 minutes. The temperature at the second calcining stage at which the granules are kept for 3 minutes is 1,200° C.

The Keramzit produced has a bulk density of 145 kg/m³, a strength on compression in a cylinder of 3.5 kgf/cm² and its water absorption is 22 percent by weight.

EXAMPLE 6

To produce Keramzit a clay is used of the composition of Example 5. The clay is treated in the same manner as in Example 1 but the temperature at the first calcining stage at which the granules are kept for 5 minutes is 900° C., and at the second calcining stage it is 1,150° C. and the granules are kept at this temperature for 3 minutes. The Keramzit produced has a bulk density of 250 kg/m³, a strength of 8 kgf/cm² and its water absorption is 18 percent by weight.

EXAMPLE 7

To produce Keramzit a clay of the following composition is used, in percent by weight:
$SiO_2$ — 51.27;  $Al_2O_3$ — 20.57;  $Fe_2O_3 + FeO$ — 8.08;  $CaO$ — 2.35;
$MgO$ — 2.95; $K_2O + Na_2O$ — 2.87.

The clay is treated in the same manner as in Example 1 but the temperature at the first stage of calcination is 1,000° C. at which the granules are kept for 2 minutes and at the second calcination stage it is 1,230° C. and the granules are kept at this temperature for 3.5 minutes.

The Keramzit produced has a bulk density of 100 kg/m³, a strength of 3 kgf/cm² and its water absorption is 32 percent by weight.

What is claimed is:

1. A method of producing Keramzit having a bulk density of 100–830 Kg/m³ from clay granules formed and dried at temperatures in the range of 100° to 150° C. and then treated at a temperature in the range of 200°–500° C. which comprises subjecting said granules to a two-stage calcination procedure comprising:
   (a) in the first stage rapidly heating said granules from said treating temperatures to a specific first calcination temperature within the range of 800°–1150° C.;
   (b) isothermally maintaining said granules at said first stage calcination temperature for from 0.5 to 10 minutes, the time and temperature of said first stage of calcination being such as to remove gaseous products from the upper layers of said granules and to form in said granule an outer oxidized zone the thickness of which depends on the duration of said heating;

(c) rapidly heating said granules in the second calcination stage to a specific second calcination temperature which is above said first calcination temperature and within the range of 1150°–1250° C.;

(d) isothermally maintaining said granules at said second stage calcination temperature for from 1 to 5 minutes, wherein said oxidized zone is converted to a clinker-like high strength crust and said nucleus swells; and then (e) cooling the resultant product.

2. A method according to claim 1 in which said clay granules have the following composition in percent by weight:

| | |
|---|---|
| $SiO_2$ | 46–75 |
| $Al_2O_3 + TiO_2$ | 24–11 |
| $Fe_2O_3 + FeO$ | 10–5 |
| CaO | 10–1 |
| MgO | 5–1 |
| $K_2O + Na_2O$ | 5–2 |

3. A method according to claim 2 in which light weight Keramzit having a bulk density of about 100 to 300 kg./m.$^3$ is produced and wherein said clay granules in the first calcination stage are rapidly heated to a specific temperature within the range of about 900° to 1150° C., said granules are maintained isothermally at the first stage calcination temperature for 0.5 to 5 minutes, then rapidly heated from said first stage calcination temperature to a specific second stage calcination temperature above the first stage calcination temperature and within the range of about 1150°–1230° and are then maintained at said specific second stage calcination temperature for about 3 to 5 minutes.

4. A method according to claim 3 in which said light weight Keramzit has a compression strength of about 3 to 11 kg./cm.$^2$ and a water absorption of about 16–32 percent by weight.

* * * * *